United States Patent [19]

Policastro et al.

[11] Patent Number: 4,603,177
[45] Date of Patent: Jul. 29, 1986

[54] SILICON-LACTAM BLENDS AND PRODUCTS OBTAINED THEREFROM

[75] Inventors: Peter P. Policastro, Schenectady; Herbert S. Chao, Watervliet, both of N.Y.

[73] Assignee: General Electric Company, Schenectady, N.Y.

[21] Appl. No.: 706,374

[22] Filed: Feb. 27, 1985

[51] Int. Cl.$^4$ .............................................. C08G 65/48
[52] U.S. Cl. .................................... 525/393; 521/134; 521/154; 525/474; 528/14; 528/26; 528/28
[58] Field of Search ............................ 528/14, 26, 28; 525/393, 474

[56] References Cited

U.S. PATENT DOCUMENTS 3,723,566  3/1973  Thompson et al. .................. 525/474

FOREIGN PATENT DOCUMENTS 1348783  3/1974  United Kingdom .

OTHER PUBLICATIONS

Product Data Sheet from Petrarch Systems, Inc., 4/15/83.
Structure-Reactivity Relationships of N-Alkyl(trimethylsilyl)amides, Lane et al, J. Org. Chem., vol. 43, No. 25, 1978, pp. 4890-4891.
Principles of Polymerization, G. Odian, Wiley Publishers (1981) pp. 534-541.
Preparative Methods of Polymer Chemistry, Sorenson et al., Wiley Publishers (1968) pp. 342-349.

*Primary Examiner*—Morton Foelak
*Attorney, Agent, or Firm*—William A. Teoli; James C. Davis, Jr.; James Magee, Jr.

[57] ABSTRACT

Crosslinkable polyamide blends are provided of lactam, a silicon substituted lactam and a base polymerization catalyst. The crosslinkable blends can be reinforced and converted to polyamide parts by standard molding techniques.

12 Claims, No Drawings

SILICON-LACTAM BLENDS AND PRODUCTS OBTAINED THEREFROM

CROSS REFERENCE TO RELATED APPLICATIONS

Reference is made to copending applications Ser. No. 645,638, for Silyl Polyamides and Method for Their Preparation, filed Aug. 30, 1984 of Policastro et al. and Ser. No. 752,744, for Thermoplastic-Polyamide Copolymers and Blends, filed July 8, 1985 of Chao et al.

BACKGROUND OF THE INVENTION

Prior to the present invention, crosslinked nylon compositions were prepared by anionic polymerization of a lactam utilizing an epoxy component in the presence of a basic catalyst and a promoter, as shown by Yang, U.S. Pat. No. 4,400,490. Although the nylon compositions of Yang provide useful RIM materials resulting in the production of a variety of valuable molded products, the Yang compositions are primarily a two-component system of lactam and epoxy resin. The two-components mixture must be utilized immediately after mixing to achieve effective results.

The present invention is based on the discovery that anionic polymerization of lactams can be achieved resulting in the production of crosslinked polyamide, or reinforced crosslinked polyamide using certain lactam promoters having silicon attached to the lactam nitrogen by silicon-nitrogen linkages, as defined hereinafter. The base catalyzed crosslinkable blends of lactam and silicon substituted lactam are convertible to high molecular weight polyamide upon heating. In addition, reinforced crosslinked polyamide can be made by incorporating into such silicon-lactam blends, high performance aromatic thermoplastic polymers, such as polyarylene oxides, polyarylene sulfones and polyarylene esters, or inert materials, such as glass fiber or reinforcing silica.

STATEMENT OF THE INVENTION

There is provided by the present invention, a heat curable silicon-containing lactam blend selected from the class consisting of (A) a blend comprising,
 (i) 0.01 to 100 mole percent of silicon-lactam and 99.99 to 0 mole percent of lactam and
 (ii) an effective amount of a Group I material, and
(B) a blend comprising
 (iii) a mixture of lactam, and 0.01 to 1 mole, per mole of lactam of a lactam silylating agent which is free of lactam groups attached to silicon by carbon-silicon linkages selected from organosilazanes, and organosilicon material selected from silanes and polydiorganosiloxanes, which organosilicon material has at least one labile monovalent radical attached to silicon selected from the class consisting of halogen and a monovalent group attached to silicon through an oxygen or nitrogen linkage and is capable of silylating lactam at a temperature of 140° C. to 350° C., and
 (iv) an effective amount of a Group I material, and the silicon-lactam of (A) has at least 1 silicon atom attached to a lactam ring by a silicon-nitrogen linkage selected from the class consisting of silanes, organosiloxanes, cycloorganosiloxanes, organopolysilanes, polysilalkylenes, polysilarylenes, organosilazanes and cycloorganosilazanes.

There is also provided by the present invention a method for making crosslinked polyamide compositions which comprises heating the above defined heat curable silicon-containing lactam blends at a temperature in the range of between 140° C. to 350° C.

Lactam which can be utilized in the practice of the present invention is included by the formula

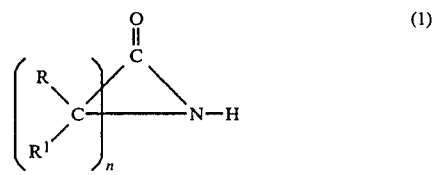

where R and R$^1$ are members selected from the class consisting of hydrogen, C$_{(1-8)}$ alkyl, substituted C$_{(1-8)}$ alkyl, C$_{(6-13)}$ aryl, substituted C$_{(6-13)}$ aryl and mixtures thereof, and n is an integer equal to 1–13 inclusive.

Some of the lactams included by formula (1) are, for example,

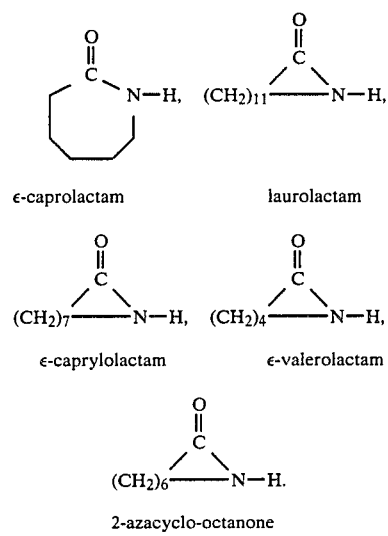

Silicon-lactam of (A) as shown in the Statement of the Invention which can be used are, for example, silanes such as

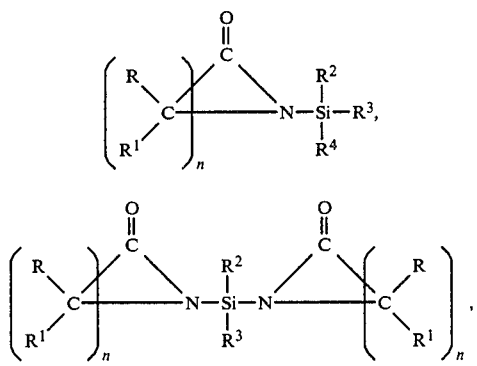

where R, R$^1$ and n are as previously defined, and R$^2$, R$^3$ and R$^4$ are the same or different radical selected from R, $R^1$ and $C_{(1-8)}$ alkoxy; the silicon-lactam of (A) also includes organosiloxanes and organosilazanes such as

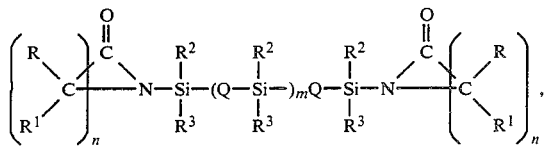

and polysilanes such as,

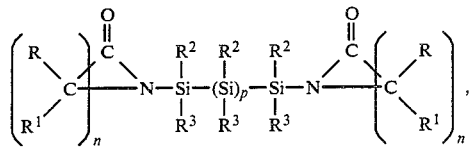

where R, $R^1$, $R^2$, $R^3$ and n are as previously defined, Q is selected from O and N, m has a value of 0 to 1000 inclusive and p has a value of 0 to 50 inclusive.

Radicals included by R and $R^1$ are, for example, $C_{(1-8)}$ alkyl such as methyl, ethyl, propyl, butyl, etc; halo alkyl such as chloroethyl; $C_{(6-13)}$ aryl such as phenyl, xylyl, tolyl, naphthyl; halo aryl such as chlorophenyl, chlorotolyl; alkaryl such as benzyl, ethylphenyl. Radicals included by $R^2$, $R^3$ and $R^4$ include all the aforementioned R and $R^1$ radicals and $C_{(1-8)}$ alkoxy such as methoxy alkoxy, propoxy, etc.

Some of the organosilicon material of (B) as shown in the Statement of the Invention can be selected from silanes and polydiorganosiloxanes and can be used to make the heat curable silicon containing lactam blends in situ when heated at temperatures up to 350° C. in combination with lactam as previously defined. The silanes preferably have a boiling point of at least 25° C. and are included within the formula $$(R^5)_a SiX_{4-a},$$

where X is preferably halogen, such as chloro or carbamoto, amido, amino, ureido, imido, vinyloxy, aryloxy, acyloxy organosulfonate and imidazolyl, $R^5$ is selected from $C_{(1-13)}$ monovalent hydrocarbon radicals, substituted $C_{(1-13)}$ monovalent hydrocarbon radicals, and $C_{(1-8)}$ alkoxy radicals and a has a value of 0 to 3 inclusive. Some of these silanes are, for example,
allyldimethylchlorosilane;
N,O-bis(trimethylsilyl)carbamate;
N,O-bis(trimethylsilyl)trifluoroacetamide;
N,N-bis(trimethylsilyl)urea;
bromotrimethylsilane;
1-(tert-butyldimethylsilyl)imidazole;
tert-butyldimethylsilyltrifluoromethanesulfonate;
tert-butyltrimethylsilylacetate;
N-methyl-N-dimethylsilyltrifluoroacetamide.

Among the preferred polydiorganosiloxanes which can be used in the in situ generation of the heat curable silicon containing lactam are compounds included within the formula,

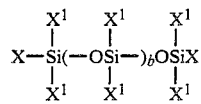

where $X^1$ is selected from $R^5$ and X and b has a value of 0 to 1000 inclusive.

Some of the organosilazanes of (B) of the Statement of the Invention which can be used as lactam silylating agents are, for example, hexamethyldisilazane, 1,3-divinyl-1,1,3,3-tetramethyldisilazane, and octamethylcyclotetrasilazane.

Group I materials, or base catalysts, which can be used in the practice of the present invention in the heat curable blends to effect the polymerization of lactam preferably have a PKA of at least 13. These base catalysts can be, for example, alkali metals such as lithium, potassium, sodium, cesium, rubidium and the corresponding hydrides, hydroxides, carbonates, fluorides, $C_{(1-8)}$ alkoxides and amides such as sodium hydride, lithium hydride, sodium hydroxide, potassium carbonate, cesium fluoride, sodium amide, sodium methoxide; organo alkali compounds, for example, methyl, butyl and phenyl lithium.

The term "filler" used in the description of the heating curable compositions of the present invention include aromatic thermoplastic polymers which can be in the form of a finely divided resin such as polyphenylene ether resins, for example, poly(2,6-dimethyl-1,4-phenylene)ether and preferably poly(2,6-dimethyl-1,4-phenylene)ether having an intrinsic viscosity of about 0.45 deciliters per gram (dl/g) as measured in chloroform at 30° C., aromatic polysulfones resins, polybutyleneterephthalate resins and polyetherimide resins. In addition to the aforementioned aromatic thermoplastic materials, there can be utilized finely divided inert fillers, including titanium dioxide, zirconium silicate, silica aerogel, iron oxide, diatomaceous earth, fumed silica, carbon black, precipitated silica, glass fibers, polyvinylchloride, ground quartz and calcium carbonate. The amounts of filler used can obviously be varied within wide limits in accordance with the intended use. There can be used up to 100 parts of filler, per 100 parts of the heat curable silicon containing lactam blends.

In the practice of the present invention, the heat curable silicon containing lactam blends can be made by a dry blending procedure involving milling the lactam and silicon-lactam or organosilicon material along with the base catalyst and filler on a mill or Henchel mixer. Another procedure which can be used to blend the various ingredients is by converting the lactam or silicon-lactam or both to the liquid state to facilitate the intermixing of the various ingredients of the blend, such as the lactam ingredients, base catalyst and the filler. A third procedure which can be used to make the heat curable silicon-lactam blend is by forming the silicon-lactam in situ by heating the lactam in the presence of the base catalyst and organosilicon material as previously described.

Although the order of the addition of the various ingredients is not critical, it is preferred to incorporate the Group I metal material before the temperature of the mixture achieves 140° C. An effective amount of the Group I metal material or base catalyst in the heat curable silicon containing lactam blend is from 0.02 to 110 mole percent of base catalyst based on the moles of silicon-lactam of (A) or organosilazane or organosilicon material of (B). It also has been found that optimum results can be achieved if mixing of the various ingredients is effected under an inert atmosphere, such as nitrogen, particularly where the Group I material is sensitive to moisture or oxygen.

In instances where a reinforcing filler or thermoplastic aromatic polymeric resin is added to the heat curable silicon-lactam blend to produce a uniform mixture, it can be pelletized by heating the blend to a temperature up to about 140° C. to permit the ingredients to agglomerate together. It is preferred to store the resulting pellets in an inert moisture-free atmosphere at ambient temperatures if an extended shelf period is desired. The pellets can thereafter be heated to a temperature of about 150° C. to 350° C. to produce reinforced shaped parts of crosslinked polyamide in accordance with standard RIM or injection molding procedures.

In order that those skilled in the art will be better able to practice the invention, the following examples are given by way of illustration and not by way of limitation. All parts are by weight.

EXAMPLE 1

There was added 0.2 gram (0.008 mole) of sodium hydride to 10 grams (0.09 mole) of $\epsilon$-caprolactam which was in the form of a melt after being heated at 130° C. After evolution of hydrogen gas terminated, there was added 0.6 gram (0.003 mole) of N-trimethylsilylcaprolactam. After the resulting solution was stirred for at least 10 minutes, it was heated at 195° C. The mixture polymerized for 1 minute to produce a tough solid. The solid was cut up into small pieces. It was found to be insoluble in both formic acid and meta-cresol showing it was a crosslinked polyamide.

The same procedure was repeated except that 1.0 grams (0.07 mole) of cesium fluoride were substituted for the sodium hydride. A crosslinked, polyamide foam was obtained.

EXAMPLE 2

There are added 4 grams of polyphenylene oxide having an intrinsic viscosity of 0.47 dl/g in chloroform to a melt of 16.9 grams (0.15 mole) of $\epsilon$-caprolactam and 0.6 grams (0.025 mole) of sodium hydride at a temperature of 130° C. The resulting mixture was stirred until a homogeneous solution was obtained. There was then added 0.6 gram (0.003 mole) of N-trimethylsilyl lactam and the solution was stirred for an additional 5 minutes at 130° C. The reaction mixture was then heated in an oil bath to a temperature of 195° C. There was obtained a solid blend of polyphenylene oxide and crosslinked polyamide after about 10 minutes of heating.

EXAMPLE 3

A mixture of 20 grams (0.18 mole) of caprolactam and 0.5 gram (0.02 mole) of sodium hydride was heated with stirring at 100° C. When hydrogen evolution ceased, there was added 5 grams of a polyphenylene oxide having an intrinsic viscosity of 0.47 dl/g in chloroform at 25° C. The mixture was stirred until a homogeneous solution was obtained. There was then added to the solution, 0.6 gram (0.003 mole) of N-trimethylsilylcaprolactam. The resulting solution was then cooled to room temperature to provide a solid mass. The solid mass was then diced into pellets. The resulting pellets are added to a mold and heated to a temperature of 195° C. under a pressure of 100 psi. There is obtained a molded part in about 10 minutes. The molded part is found to be insoluble in meta-cresol indicating it has a crosslinked polyamide matrix.

EXAMPLE 4

A mixture of 5 grams (0.04 mole) of caprolactam and 5 grams (0.025 mole) of laurolactam was heated to a temperature of 130° C. and the resulting melt was stirred. There was added 0.4 gram of sodium hydride and the mixture was stirred until hydrogen evolution ceased. There was then added 0.4 gram (0.002 mole) of N-trimethylsilyl lactam to the resulting mixture which was heated to a temperature of 195° C. There was obtained a tough material which was found to be insoluble in meta-cresol.

EXAMPLE 5

There was added 0.3 grams (0.012 mole) of sodium hydride to 10 grams (0.09 mole) of $\epsilon$-caprolactam which was in the form of a melt after having heated at 130° C. After evolution of hydrogen as terminated, the reaction mixture was cooled down to 80° C. There was added, 0.65 gram (0.006 mole) of chlorotrimethylsilane. The mixture was heated to 210°–220° C. It polymerized in 1 minute to produce a tough solid. The solid was insoluble in formic acid showing it was a crosslinked polyamide.

Although the above examples are directed to only a few of the very many variables which can be used in the practice of the present invention to produce heat curable silicon-lactam blends and crosslinked polyamide therefrom, it should be understood that the present invention is directed to the use of a much broader variety of lactams, silicon-lactams, Group I metal materials and reinforcing fillers as shown in the description preceding these examples.

What we claim as new and desire to secure by Letters Patent of the United States is:

1. A heat curable composition comprising an effective amount of a Group I material, and a silicon-containing lactam material selected from the class consisting of
   (A) a silicon-lactam,
   (B) a blend of silicon-lactam and lactam, having at least 0.01 mole percent of silicon lactam based on the total moles of silicon-lactam and lactam, and
   (C) a blend comprising a mixture of lactam, and 0.01 to 1 mole, per mole of lactam of a lactam silylating agent which is free of lactam groups attached to silicon by carbon-silicon linkages selected from organosilazanes, and organosilicon matlerial selected from silanes and polydiorganosiloxanes, which organosilicon material has at least one labile monovalent radical attached to siicon selected from the class consisting of halogen and a monovalent group attached to silicon through an oxygen or nitrogen linkage and is capable of silylating lactam at a temperature of 140° C. to 350° C., and
where the silicon-lactam of (A) and (B) has at least 1 silicon atom attached to a lactam ring by a silicon-nitrogen linkage selected from the class consisting of silanes, organosiloxanes, cycloorganosiloxanes, organopolysilanes, polysilalkylenes, polysilarylenes, organosilazanes and cycloorganosilazanes.

2. A composition in accordance with claim 1, having up to 100 parts of filler, per 100 parts of heat curable silicon-containing lactam blend.

3. A composition in accordance with claim 2 where the filler is a polyphenylene oxide.

4. A composition in accordance with claim 1, where the organosilicon material of (B) is a member selected from the class consisting of dimethyldichlorosilane, t-butyldimethylchlorosilane and trimethylchlorosilane.

5. A composition in accordance with claim 1, where the lactam is ε-caprolactam.

6. A composition in accordance with claim 1, where the lactam is in the form of a mixture of lactams.

7. A composition in accordance with claim 1, where the silicon-lactam is N-trimethylsilyl lactam.

8. A composition in accordance with claim 1, where the Group I metal material is an alkali metal hydride.

9. A composition in accordance with claim 1, where the Group I metal material is an alkali metal.

10. A composition in accordance with claim 1, where the Group I metal material is alkali fluoride.

11. A composition in accordance with claim 1, where the Group I metal material is an organoalkali compound.

12. A method for making cross-linked polyamide which comprises heating a mixture at a temperature in the range of between 140° C. to 350° C. where said mixture comprises an effective amount of a Group I material, and a silicon-containing lactam material selected from the class consisting of (A) a silicon-lactam,
(B) a blend of silicon-lactam and lactam, having at least 0.01 mole percent of silicon lactam based on the moles of silicon-lactam and lactam, and
(C) a blend comprising a mixture of lactam, and 0.01 to 1 mole, per mole of lactam of a lactam silylating agent which is free of lactam groups attached to silicon by carbon-silicon linkages selected from organosilazanes, and organosilicon material selected from silanes and polydiorganosiloxanes, which organosilicon material has at least one labile monovalent radical attached to siicon selected from the class consisting of halogen and a monovalent group attached to silicon through an oxygen or nitrogen linkage and is capable of silylating lactam at a temperature of 140° C. to 350° C., and where the silicon-lactam of (A) and (B) has at least 1 silicon atom attached to a lactam ring by a silicon-nitrogen linkage selected from the class consisting of silanes, organosiloxanes, cycloorganosiloxanes, organopolysilanes, polysilalkylenes, polysilarylenes, organosilazanes and cycloorganosilazanes.

* * * * *